US008880306B2

(12) United States Patent
Minami

(10) Patent No.: US 8,880,306 B2
(45) Date of Patent: Nov. 4, 2014

(54) VEHICLE

(71) Applicant: Yamaha Hatsudoki Kabushiki Kaisha, Iwata (JP)

(72) Inventor: Kengo Minami, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 141 days.

(21) Appl. No.: 13/688,282

(22) Filed: Nov. 29, 2012

(65) Prior Publication Data

US 2014/0046559 A1 Feb. 13, 2014

(30) Foreign Application Priority Data

Aug. 10, 2012 (JP) ................................. 2012-178449

(51) Int. Cl.
| | |
|---|---|
| B60K 28/16 | (2006.01) |
| G06F 17/00 | (2006.01) |
| G06F 19/00 | (2011.01) |
| G06F 7/00 | (2006.01) |
| B60W 30/18 | (2012.01) |
| B60W 10/02 | (2006.01) |
| B60W 10/06 | (2006.01) |
| B60W 10/11 | (2012.01) |
| B60W 30/19 | (2012.01) |

(52) U.S. Cl.
CPC ......... B60W 30/18027 (2013.01); B60W 10/02 (2013.01); B60W 10/06 (2013.01); B60W 10/11 (2013.01); B60W 30/18172 (2013.01); B60W 30/19 (2013.01); B60W 2510/0208 (2013.01); B60W 2510/0225 (2013.01); B60W 2520/10 (2013.01); B60W 2520/26 (2013.01); B60W 2520/28 (2013.01); B60W 2710/022 (2013.01); B60W 2710/025 (2013.01); B60W 2710/0605 (2013.01); B60W 2710/0616 (2013.01); B60W 2710/086 (2013.01); B60Y 2200/12 (2013.01)
USPC ................... 701/54; 701/58; 701/68; 701/71; 180/197

(58) Field of Classification Search
CPC ............... B60W 2510/0225; B60W 30/18172; B60W 10/02; B60W 10/06; B60W 2520/26; B60W 2520/28; B60W 2520/0605
USPC ........... 701/36, 45, 51, 53, 54, 58, 65, 66, 67, 701/68, 70, 71, 82, 84, 87, 90, 91; 180/197, 180/271
See application file for complete search history.

(56) References Cited

U.S. PATENT DOCUMENTS

2006/0124422 A1* 6/2006 Zenno ......................... 192/3.61

FOREIGN PATENT DOCUMENTS

JP 07-103009 A 4/1995

OTHER PUBLICATIONS

Minami, "VEHICLE", U.S. Appl. No. 13/688,272, filed Nov. 29, 2012.
Minami, "VEHICLE", U.S. Appl. No. 13/688,286, filed Nov. 29, 2012.

* cited by examiner

*Primary Examiner* — Thomas Tarcza
*Assistant Examiner* — Edward Pipala
(74) *Attorney, Agent, or Firm* — Keating & Bennett, LLP

(57) ABSTRACT

A vehicle includes a friction clutch located between an engine and a driving wheel; a clutch actuator arranged to disengage and engage the friction clutch; a clutch actuator control section arranged and programmed to control the clutch actuator; a slip detection section arranged to detect a slip of the driving wheel; and an engine control section arranged and programmed to decrease an output of the engine when the slip of the driving wheel is detected by the slip detection section. When the friction clutch is in a half clutch state and the slip of the driving wheel is detected, the clutch actuator control section is arranged and programmed to control the clutch actuator so as to maintain a pushing force of the friction clutch at a fixed or substantially fixed level.

15 Claims, 7 Drawing Sheets

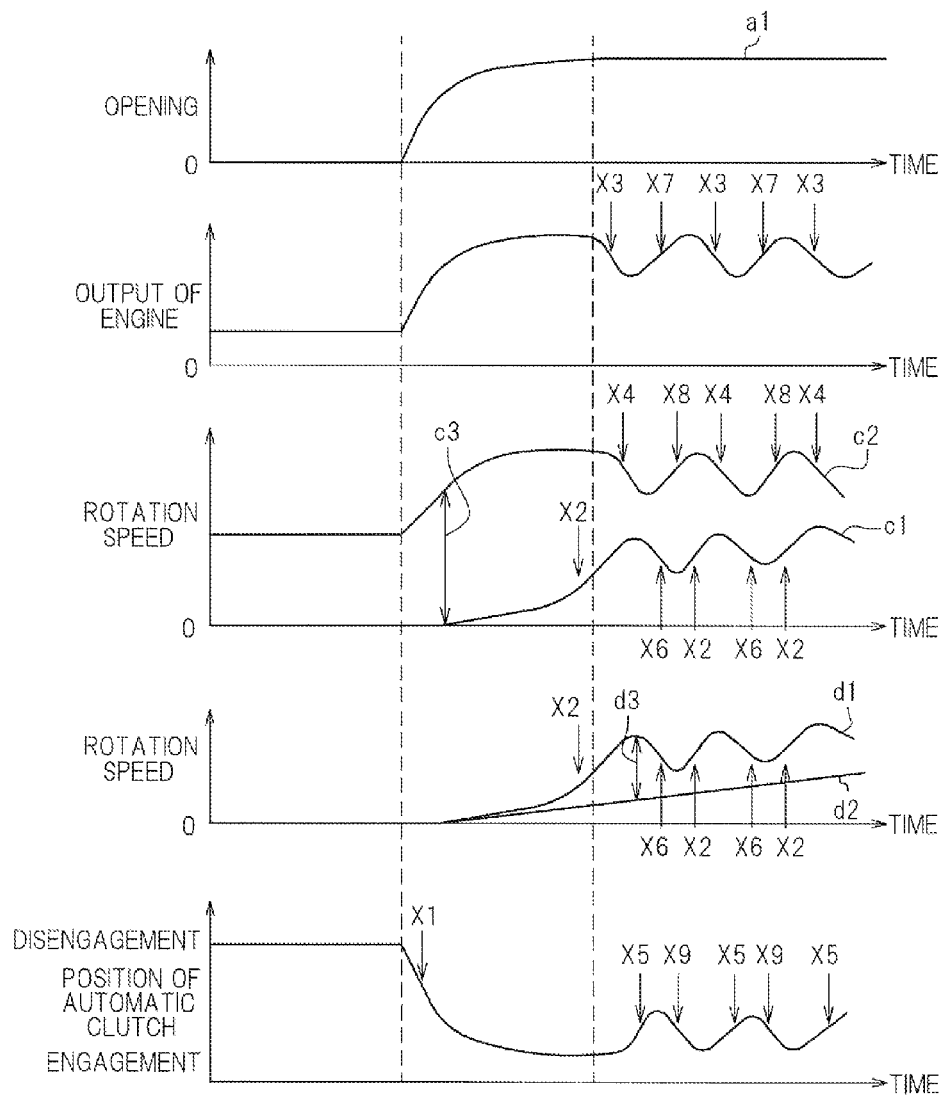

VEHICLE

BACKGROUND OF THE INVENTION

1. Field of the Invention

The present invention relates to a vehicle including a traction control device that prevents slippage of a driving wheel.

The present application claims priority from Japanese Patent Application No. 2012-178449, filed on Aug. 10, 2012, which is incorporated by reference herein in its entirety.

2. Description of the Related Art

Conventionally, as described in, for example, JP H07-103009, a vehicle including a traction control device is known. When a driving wheel slips at the time of starting or changing a gear of the vehicle, the traction control device decreases an output of an engine to suppress the slip.

Also conventionally, a vehicle including an automatic clutch which is automatically engaged or disengaged without being operated by a rider is known. Known automatic clutches include, for example, a clutch which is engaged or disengaged by an actuator such as an electric motor or the like.

FIG. 7 is an example of a timing diagram obtained in the case where a vehicle including a traction control device described in JP H07-103009 also includes an automatic clutch and is subjected to traction control. In this example, the clutch is engaged or disengaged in accordance with the rotation speed (number of rotations per unit time; see reference character c2 in FIG. 7) of the engine. Therefore, at the time of starting or changing a gear of the vehicle, the clutch is put into a half clutch state from a disengaged state in accordance with an increase of the rotation speed of the engine (see arrow X1 in FIG. 7). When, at this point, the driving wheel slips with respect to a road surface (see arrows X2 in FIG. 7), the traction control device performs control to decrease the output of the engine in order to suppress the slip (see arrow X3 in FIG. 7). As a result, the rotation speed of the engine is decreased (see arrow X4 in FIG. 7), and therefore the clutch is shifted toward a position at which the clutch is disengaged (hereinafter referred to as a "disengagement position"; see arrow X5 in FIG. 7). As a result of the clutch being shifted toward the disengagement position, a torque conveyed from the engine to the driving wheel is decreased. Therefore, the amount of slip of the driving wheel (see reference character d3 in FIG. 7) is decreased (see arrow X6 in FIG. 7). When the amount of slip of the driving wheel is decreased, the traction control device increases the output of the engine (see arrow X7 in FIG. 7) and increases the rotation speed of the engine (see arrow X8 in FIG. 7). When, at this point, the clutch is shifted toward a position at which the clutch is engaged (hereinafter, referred to as an "engagement position"; see arrow X9 in FIG. 7) as a result of the increase of the output of the engine, the torque conveyed to the driving wheel is increased. Therefore, the driving wheel may slip again. As a result of the above-described series of operations being repeated, vibration is generated based on hunting of the clutch position, and thus the comfort of riding is lowered. In FIG. 7, reference character a1 represents an accelerator opening, reference character c1 represents a rotation speed of a main shaft, and reference character c3 represents a difference between the rotation speed of the engine and the rotation speed of the main shaft. Reference character d1 represents the rotation speed of the driving wheel, and reference character d2 represents a rotation speed of a subordinate wheel.

SUMMARY OF THE INVENTION

Preferred embodiments of the present invention provide a vehicle arranged to suppress a slip of a driving wheel at the time of starting or changing a gear of the vehicle and to also suppress the generation of vibration based on hunting of the clutch position to improve the comfort of riding.

A vehicle according to a preferred embodiment of the present invention includes an engine; a driving wheel drivable by the engine; a friction clutch located between the engine and the driving wheel; a clutch actuator arranged to disengage and engage the friction clutch; a clutch state detection device arranged to detect a half clutch state of the friction clutch; a driving wheel detection sensor arranged to detect a rotation speed of the driving wheel; a vehicle speed detection sensor arranged to detect a vehicle speed; a traction control device including a slip detection section arranged to detect a slip of the driving wheel based on the rotation speed of the driving wheel detected by the driving wheel detection sensor and the vehicle speed detected by the vehicle speed detection sensor, and an engine control section arranged and programmed to perform control to decrease an output of the engine when the slip of the driving wheel is detected by the slip detection section; and a clutch actuator control device arranged and programmed to control the clutch actuator based on a rotation speed of the engine. When the friction clutch is in a half clutch state and the slip of the driving wheel is detected, the clutch actuator control device controls the clutch actuator so as to keep a pushing force of the friction clutch at a fixed level.

When the friction clutch is in a half clutch state and the driving wheel slips, the engine control section of the traction control device performs the control to decrease the output of the engine, and therefore can suppress and prevent an increase of the amount of slip of the driving wheel. When the friction clutch is in a half clutch state and the slip of the driving wheel is detected, the clutch actuator control device is arranged and programmed to control the clutch actuator so as to keep the pushing force of the friction clutch at a fixed level. As a result, even if the output and the rotation speed of the engine continue decreasing, the friction clutch is kept at a fixed position. Therefore, the friction clutch can be engaged swiftly. As a result, the decrease of the output of the engine can be conveyed to the driving wheel quickly, and thus the amount of slip can be decreased swiftly. In this manner, when the friction clutch is in a half clutch state and the driving wheel slips, the clutch actuator is controlled so as to keep the pushing force of the friction clutch at a fixed level. Therefore, the position of the friction clutch is not changed, and vibration based on the hunting of the clutch position is not generated. In addition, since the friction clutch can be engaged swiftly, the amount of slip can be decreased swiftly. When the friction clutch is in a half clutch state, it is conceivable to prohibit the engine control section of the traction control device from performing the control to decrease the output of the engine. In this case, the control to decrease the output of the engine is not performed until the friction clutch is engaged. Therefore, the hunting of the clutch position does not occur, and thus no vibration is generated. However, the control to decrease the output of the engine is not performed when the friction clutch is in a half clutch state. Therefore, a slip of the driving wheel, if occurring when the friction clutch is in a half clutch state, cannot be suppressed. Such a slip of the driving wheel lowers the comfort of riding. Accordingly, the effects provided by the vehicle according to a preferred embodiment of the present invention are not provided by prohibiting the control to decrease the output of the engine when the friction clutch is in a half clutch state.

According to a preferred embodiment of the present invention, when the friction clutch is in a half clutch state and the slip of the driving wheel is detected, the clutch actuator control device is arranged and programmed to control the clutch actuator so as to keep the pushing force of the friction clutch at a level thereof at the time when the slip is detected.

As a result, the friction clutch can be engaged swiftly by the output and the rotation speed of the engine is continued to be decreased. As a result, the decrease of the output of the engine can be conveyed to the driving wheel quickly, and thus the amount of slip can be decreased swiftly.

According to a preferred embodiment of the present invention, the vehicle further includes a hydraulic cylinder arranged to generate an oil pressure by driving the clutch actuator. When the friction clutch is in a half clutch state and the slip of the driving wheel is detected, the clutch actuator control device controls the clutch actuator so as to keep the oil pressure of the hydraulic cylinder at a fixed level and thus keeps the pushing force of the friction clutch at a fixed level.

In this manner, the oil pressure of the hydraulic cylinder is kept at a fixed level, and thus the pushing force of the friction clutch can be kept at a fixed level.

According to a preferred embodiment of the present invention, when the friction clutch is in a half clutch state and the slip of the driving wheel is detected, the clutch actuator control device is arranged and programmed to control the clutch actuator so as to keep a position of the friction clutch at a fixed position.

As a result, the friction clutch can be engaged swiftly by the output and the rotation speed of the engine being kept decreasing. As a result, the decrease of the output of the engine can be conveyed to the driving wheel quickly, and thus the amount of slip can be swiftly decreased.

According to a preferred embodiment of the present invention, when the friction clutch is in a half clutch state and the slip of the driving wheel is detected, the clutch actuator control device controls the clutch actuator so as to keep a position of the friction clutch at a position thereof at the time when the slip is detected.

As a result, the friction clutch can be engaged swiftly by the output and the rotation speed of the engine being kept decreasing. As a result, the decrease of the output of the engine can be conveyed to the driving wheel quickly, and thus the amount of slip can be swiftly decreased.

According to a preferred embodiment of the present invention, the friction clutch includes a driving-side rotation body to which a torque of the engine is conveyed and a subordinate-side rotation body capable of contacting, and being separated from, the driving-side rotation body; the vehicle further includes a clutch rotation speed difference detection device arranged to detect a rotation speed difference between the driving-side rotation body and the subordinate-side rotation body of the friction clutch; and when the rotation speed difference between the driving-side rotation body and the subordinate-side rotation body of the friction clutch becomes substantially zero while the clutch actuator control device controls the clutch actuator so as to keep the pushing force of the friction clutch at a fixed level, the clutch actuator control device stops controlling the clutch actuator so as to keep the pushing force of the friction clutch at a fixed level and controls the clutch actuator so as to engage the friction clutch.

As a result, when the rotation speed of the driving-side rotation body and the rotation speed of the subordinate-side rotation body of the friction clutch become substantially equal to each other, the control to keep the pushing force of the friction clutch at a fixed level is stopped and the control to engage the friction clutch is performed promptly. Thus, the decrease of the output of the engine can be conveyed to the driving wheel quickly. As a result, the amount of slip can be swiftly decreased.

According to a preferred embodiment of the present invention, the vehicle further includes an engine rotation speed sensor arranged to detect the rotation speed of the engine. When the rotation speed of the engine becomes equal to or lower than a prescribed value while the clutch actuator control device controls the clutch actuator so as to keep the pushing force of the friction clutch at a fixed level, the clutch actuator control device stops controlling the clutch actuator so as to keep the pushing force of the friction clutch at a fixed level and controls the clutch actuator so as to disengage the friction clutch.

In this manner, when the rotation speed of the engine becomes equal to or lower than a prescribed value, the control to keep the pushing force of the friction clutch at a fixed level is stopped and the control to disengage the friction clutch is performed. Thus, engine stall can be prevented.

According to a preferred embodiment of the present invention, when the friction clutch is in a half clutch state and the slip of the driving wheel is not detected, the clutch actuator control device is arranged and programmed to control the clutch actuator so as to engage the friction clutch when the rotation speed of the engine is increased and controls the clutch actuator so as to disengage the friction clutch when the rotation speed of the engine is decreased.

As a result, the friction clutch can be engaged and disengaged easily.

According to a preferred embodiment of the present invention, the vehicle further includes a stepped transmission mechanism and a shift actuator arranged to drive the transmission mechanism.

Since the change of the gear position of the transmission mechanism can be performed by use of the shift actuator, the operability for the rider is improved. If hunting of the clutch position occurs when the transmission mechanism is controlled by the shift actuator, this may adversely influence the change of the gear position of the transmission mechanism. However, according to a preferred embodiment of the present invention, the hunting of the clutch position does not occur. Therefore, even when the transmission mechanism is controlled by the shift actuator, there is no adverse influence on the change of the gear position of the transmission mechanism.

According to a preferred embodiment of the present invention, the vehicle further includes a shift actuator control device arranged and controlled to drive the transmission mechanism by use of the shift actuator after the friction clutch starts to be disengaged by the clutch actuator.

As a result, the change of the gear position can be performed in a satisfactory manner.

According to a preferred embodiment of the present invention, the vehicle further includes an electronically controllable throttle valve. When the slip of the driving wheel is detected, the engine control section of the traction control device executes control to decrease an opening of the throttle valve.

In this manner, the opening of the throttle valve is decreased, and thus the output of the engine can be decreased easily.

According to a preferred embodiment of the present invention, the vehicle further includes an ignition device. When the slip of the driving wheel is detected, the engine control section of the traction control device executes ignition retarding control on the ignition device.

In this manner, the time of igniting the ignition device is retarded, and thus the output of the engine can be decreased easily.

According to a preferred embodiment of the present invention, the vehicle further includes a fuel injection device. When the slip of the driving wheel is detected, the engine control section of the traction control device executes fuel injection amount decreasing control on the fuel injection device.

In this manner, fuel injection from the fuel injection valve is stopped or the amount of fuel injection is decreased, and thus the output of the engine can be decreased easily.

According to a preferred embodiment of the present invention, the vehicle further includes a subordinate wheel rotating in accordance with running of the vehicle; and the vehicle speed detection sensor is a sensor arranged to detect a rotation speed of the subordinate wheel.

As a result, the slip detection section can detect the slip of the driving wheel based on the rotation speed of the subordinate wheel detected by the vehicle speed detection sensor and the rotation speed of the driving wheel detected by the driving wheel detection sensor.

According to a preferred embodiment of the present invention, the vehicle is a motorcycle.

According to a preferred embodiment of the present invention, a motorcycle providing the above-described functions and effects can be provided.

As described above, the present invention provides a vehicle arranged to suppress and prevent a slip of a driving wheel at the time of starting or changing a gear of the vehicle and to suppress and prevent the generation of vibration based on hunting of the clutch position, and thus improving the comfort of riding.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a timing diagram on traction control performed on a conventional vehicle.

DETAILED DESCRIPTION OF THE PREFERRED EMBODIMENTS

Figure 1:
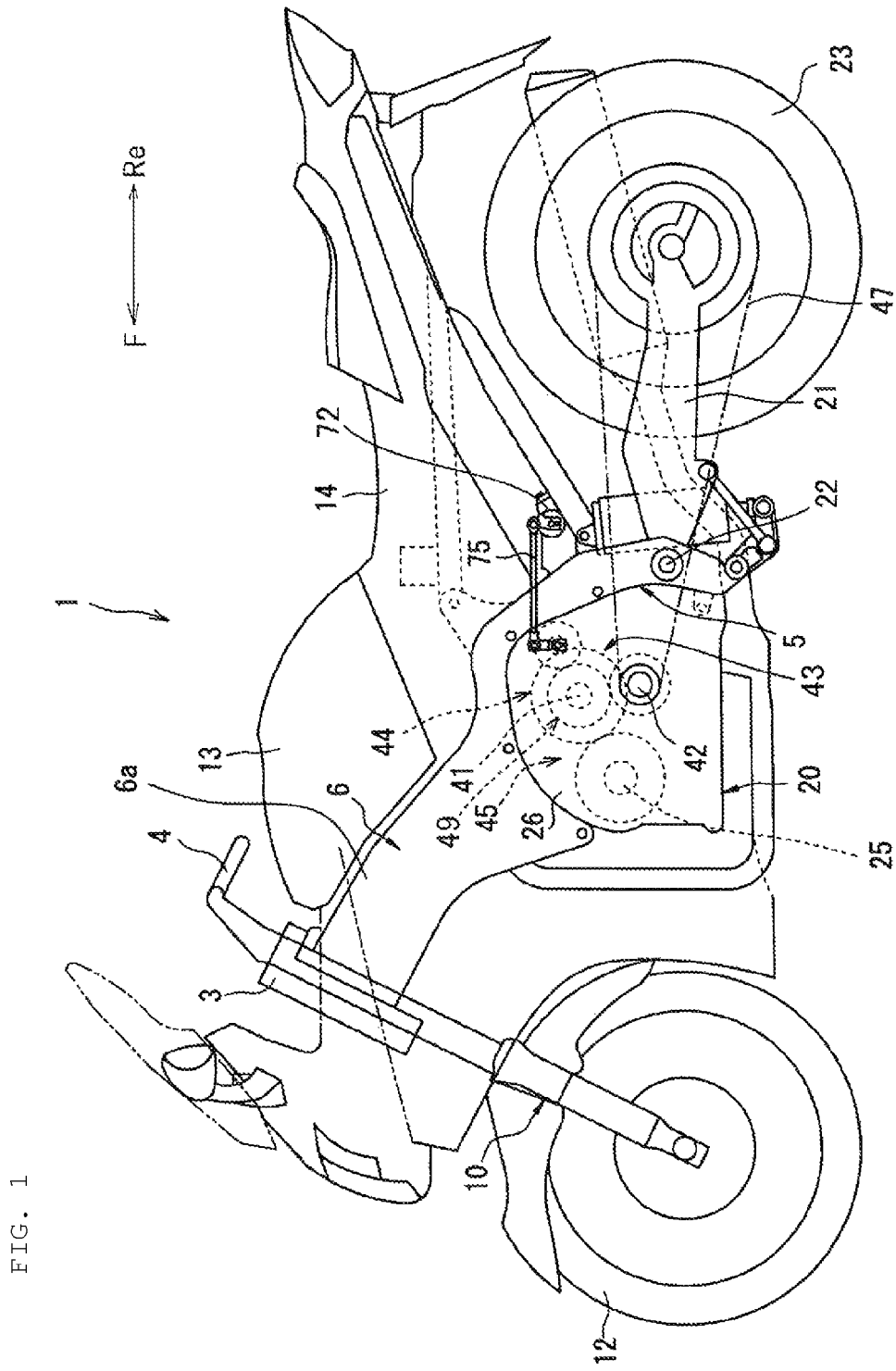
FIG. 1 is a side view of a motorcycle according to a preferred embodiment of the present invention.

Hereinafter, preferred embodiments of the present invention will be described. As shown in FIG. 1, a vehicle according to a preferred embodiment of the present invention is a motorcycle 1. The motorcycle 1 is not limited to any specific type and may be of, for example, a so-called scooter type, a moped type, an off-road type, an on-road type or the like. A vehicle according to the present invention is not limited to a motorcycle, and may be a saddle type vehicle which a rider (user) rides astride or an equivalent thereof. Saddle type vehicles include, for example, an ATV (All Terrain Vehicle), a four-wheel buggy or the like in addition to a motorcycle. In FIG. 1, reference characters F and Re respectively represent "front" and "rear".

As shown in FIG. 1, the motorcycle 1 preferably includes a head pipe 3 and a body frame 6. The body frame 6 preferably includes two, i.e., left and right, frames 6a extending rearward from the head pipe 3. FIG. 1 shows only one frame 6a. A rear portion of the frame 6a extends downward. The rear portion of the frame 6a is connected to a rear arm bracket 5. The rear arm bracket 5 is connected to a front end portion of a rear arm 21 via a pivot shaft 22. The rear arm 21 is swingable upward and downward about the pivot shaft 22. At a rear end portion of the rear arm 21, a rear wheel 23 is supported. The rear wheel 23 is a driving wheel drivable by an engine 45, described later. The motorcycle 1 preferably includes a driving wheel detection sensor 92 (see FIG. 4). The driving wheel detection sensor 92 is arranged to detect a rotation speed of the rear wheel 23. Based on the detected rotation speed, the driving wheel detection sensor 92 outputs a rear wheel rotation speed signal to an ECU 100 (Electronic Control Unit), see FIG. 4.

A fuel tank 13 is preferably located above the frame 6a. A seat 14 on which the rider may sit is located rearward of the fuel tank 13.

The head pipe 3 is arranged to support a steering shaft (not shown), and a handle 4 is provided on the steering shaft. The handle 4 is preferably provided with a shift switch (not shown). The shift switch preferably includes a shift-up switch and a shift-down switch, and can be used to increase or decrease a transmission gear 49, described later, in the range from a neutral position to a maximum position (e.g., a sixth gear) by a manual operation. The shift switch outputs a gear change instruction from the rider to a shift actuator control section 140 (see FIG. 4) described later.

At a lower portion of the steering shaft, a front fork 10 is provided. At a lower end of the front fork 10, a front wheel 12 is rotatably supported. The front wheel 12 is a subordinate wheel rotating in accordance with the running of the motorcycle 1. The motorcycle 1 preferably includes a vehicle speed detection sensor 94 (see FIG. 4). The vehicle speed detection sensor 94 is arranged to detect a vehicle speed of the motorcycle 1. Based on the detected vehicle speed, the vehicle speed detection sensor 94 outputs a vehicle speed signal to the ECU 100. The vehicle speed detection sensor 94 may be, for example, a sensor arranged to detect a rotation speed of the front wheel 12. In this case, the vehicle speed detection sensor 94 outputs a vehicle speed signal to the ECU 100 based on the detected rotation speed.

Figure 3:
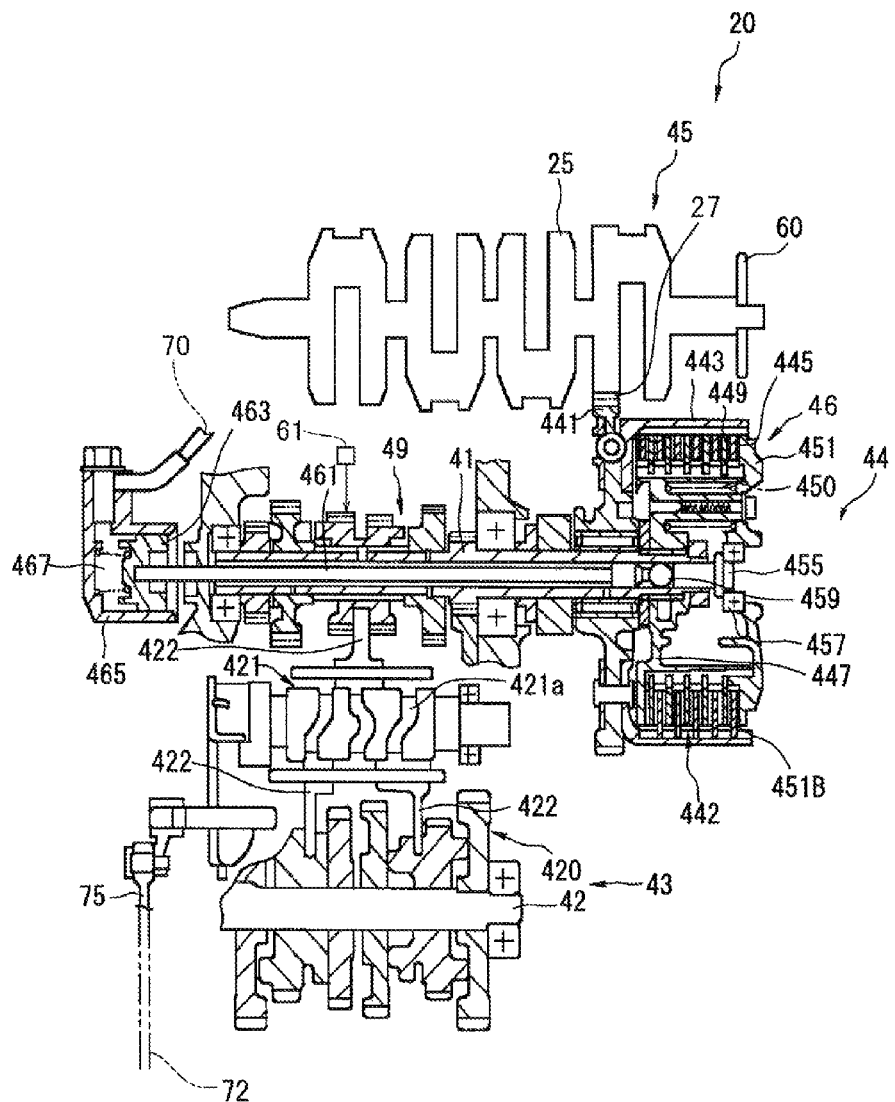
FIG. 3 is cross-sectional view showing an internal structure of a power unit according to a preferred embodiment of the present invention.

A power unit 20 is preferably suspended from the frame 6a and the rear arm bracket 5. FIG. 3 is a cross-sectional view showing an internal structure of the power unit 20. As shown in FIG. 3, the power unit 20 preferably includes at least the engine 45, an automatic clutch 44, and a transmission mechanism 43. The engine 45, the automatic clutch 44, and the transmission mechanism 43 are preferably integrally assembled with a crankcase 26 (see FIG. 1).

Figure 2:
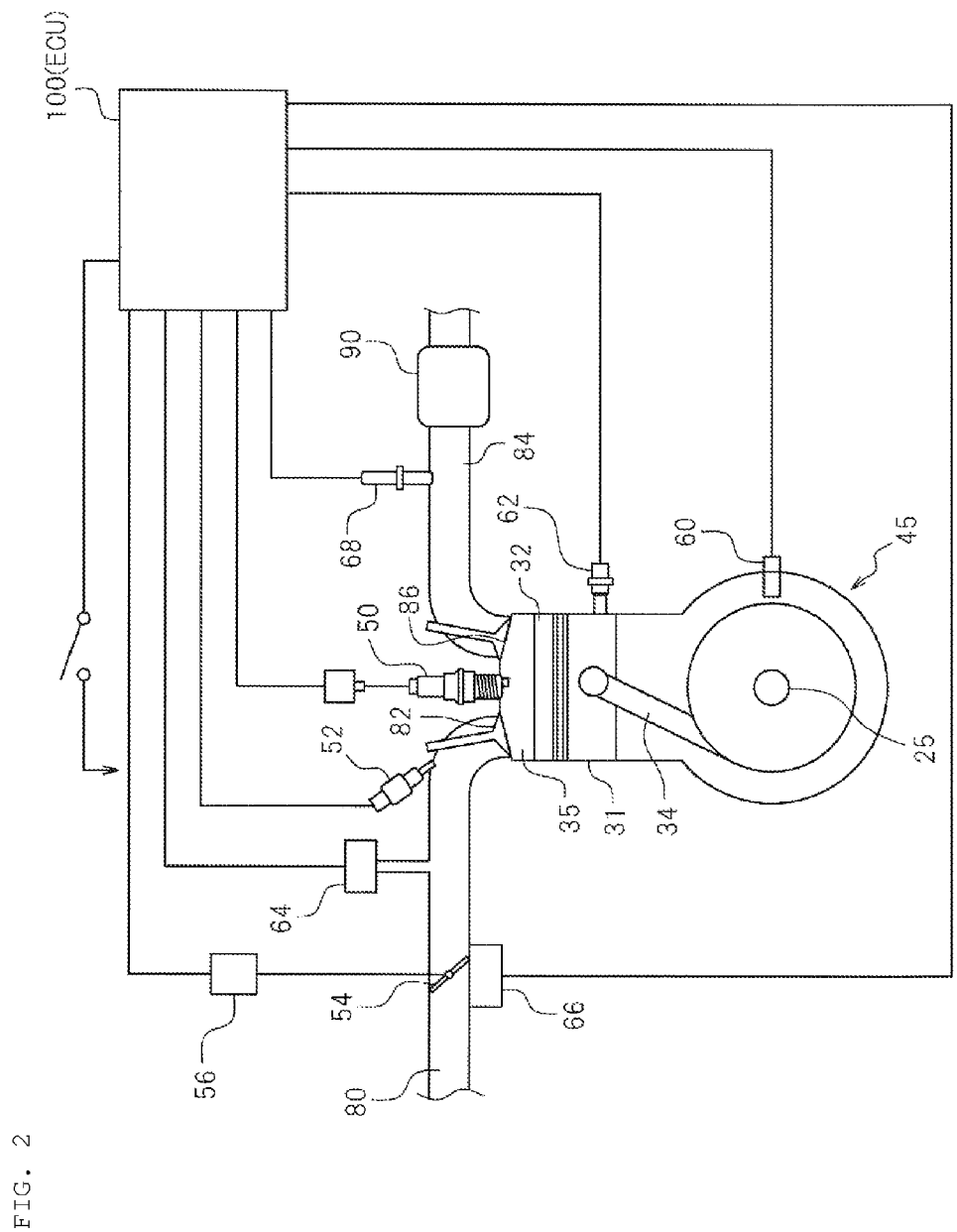
FIG. 2 is structural view of an engine according to a preferred embodiment of the present invention.

As shown in FIG. 2, the engine 45 includes a cylinder 31, a piston 32 reciprocating in the cylinder 31, a crankshaft 25, and a connection rod 34 arranged to couple the piston 32 and the crankshaft 25 to each other. The engine 45 preferably includes a fuel injection valve 52, which is a fuel injection device arranged to inject fuel, and an ignition device 50 arranged to ignite the fuel in a combustion chamber 35. The engine 45 preferably includes a crankshaft rotation speed sensor 60 arranged to detect a rotation speed (e.g., a number of rotations per unit time) of the crankshaft 25 and a temperature sensor 62 arranged to detect a temperature of the engine 45. Hereinafter, the rotation speed of the crankshaft 25 will be referred to as the "rotation speed of the engine 45". The fuel injection valve 52 is connected to a fuel tank (not shown). The temperature sensor 62 may detect the temperature of a portion of the engine 45 (e.g., cylinder). In the case where the engine 45 is a water-cooled engine, the temperature sensor 62 may alternatively detect a temperature of the cooling water. Specifically, the temperature sensor 62 may detect the temperature of the engine 45 directly or indirectly via the cooling water or the like.

The engine 45 preferably includes an intake path 80 arranged to introduce air to the combustion chamber 35, an intake valve 82 arranged to open or close the intake path 80 and the combustion chamber 35 with respect to each other, a discharge path 84 arranged to discharge exhaust gas from the combustion chamber 35, and a discharge valve 86 arranged to open and close the combustion chamber 35 and the discharge path 84 with respect to each other. In the present preferred embodiment, the fuel injection valve 52 is located so as to inject the fuel to the inside of the intake path 80. The fuel injection valve 52 may inject the fuel directly to the inside of the combustion chamber 35. Additionally, the engine 45 may include two types of fuel injection valves arranged to inject the fuel to the inside of the intake path 80 and to the inside of the combustion chamber 35, respectively.

In the intake path 80, a pressure sensor 64 is preferably provided to detect an intake pressure, which is an internal pressure of the intake path 80. In the intake path 80, a throttle valve 54 is located. The throttle valve 54 is an electronically controllable valve, a throttle opening of which is controlled by a throttle driving actuator 56. The throttle valve 54 adjusts the flow rate or the speed of air flowing in the intake path 80. A right handle of the motorcycle 1 is provided with an accelerator operator (not shown) for driving arranged to drive the throttle valve 54 via the throttle driving actuator 56. The accelerator operator includes an accelerator opening sensor (not shown) attached thereto arranged to detect an accelerator opening, which is an operation amount of the accelerator operator, namely, an opening of the accelerator operator. The throttle valve 54 is preferably provided with a throttle position sensor 66 arranged to detect the opening of the throttle valve 54. The throttle position sensor 66 outputs a throttle opening signal to the ECU 100.

In the discharge path 84, a catalyst 90 is provided. Also in the discharge path 84, an $O_2$ sensor 68 arranged to detect oxygen contained in the exhaust gas is provided as an air-to-fuel ratio sensor. The air-to-fuel ratio sensor may be any sensor which can detect at least whether the air-to-fuel ratio is in a rich region or a lean region. The $O_2$ sensor 68 according to the present preferred embodiment can detect whether the air-to-fuel ratio is in the rich region or the lean region. Needless to say, an element arranged to linearly output an air-to-fuel ratio (linear A/F sensor), namely, a sensor arranged to output the air-to-fuel ratio itself may be used as the air-to-fuel ratio sensor.

As shown in FIG. 3, the crankshaft 25 is preferably coupled to a main shaft 41 via the automatic clutch 44. The main shaft 41 is preferably located parallel or substantially parallel to the crankshaft 25. The main shaft 41 is also preferably located parallel or substantially parallel to a drive shaft 42. The main shaft 41 is preferably provided with a main shaft rotation speed sensor 61 arranged to detect a rotation speed (number of rotations per unit time) of the main shaft 41.

The automatic clutch 44 according to the present preferred embodiment preferably includes a multi-plate friction clutch 46 and a clutch actuator 70. The friction clutch 46 is located between the engine 45 and the rear wheel 23. The friction clutch 46 preferably includes a clutch housing 443 and a clutch boss 447. Inside the clutch housing 443, a plurality of friction plates 445 are provided as a driving-side rotation body. A torque of the engine 45 is conveyed to the friction plates 445. Outside the clutch boss 447, a plurality of clutch plates 449 are provided as a subordinate-side rotation body. Each of the friction plates 445 rotates together with the clutch housing 443. By contrast, each of the friction plates 445 can be moved in an axial direction of the main shaft 41. The plurality of friction plates 445 are located along the axial direction of the main shaft 41. The friction clutch 46 may alternatively be a single-plate clutch instead of the multi-plate clutch, if so desired.

Each of the clutch plates 449 faces each of the friction plates 445 adjacent thereto. Each of the clutch plates 449 rotates together with the clutch boss 447. By contrast, each of the clutch plates 449 can be moved in the axial direction of the main shaft 41. In this preferred embodiment, the plurality of friction plates 445 and the plurality of clutch plates 449 define a plate group 442.

As shown in FIG. 3, a pressure plate 451 is located outward to the main shaft 41 in a vehicle width direction (rightward in FIG. 3). The pressure plate 451 preferably is generally disc-shaped. In an outer portion of the pressure plate 451 in a radial direction thereof, a press portion 451B protruding toward the plate group 442 is preferably provided. The press portion 451B is located at a position facing the friction plate 445 which is located at the rightmost position in the plate group 442.

The friction clutch 46 is provided with a spring 450. The spring 450 urges the pressure plate 451 inward in the vehicle width direction (leftward in FIG. 3). Specifically, the spring 450 urges the pressure plate 451 in a direction in which the press portion 451B presses the plate group 442.

A central portion of the pressure plate 451 is in engagement with an end portion (right end portion in FIG. 3) of a push rod 455 via a bearing 457. Thus, the pressure plate 451 is rotatable with respect to the push rod 455. The main shaft 41 preferably has a tubular shape. The other end portion (left end portion) of the push rod 455 is accommodated in the main shaft 41. In the main shaft 41, a spherical ball 459 is provided adjacent to the other end portion (left end portion) of the push rod 455. Also in the main shaft 41, a push rod 461 is provided adjacent to the ball 459.

A left end portion of the push rod 461 protrudes outward from the main shaft 41. At the left end portion of the push rod 461, a piston 463 is integrally provided. The piston 463 is guided by a cylinder main body 465 to be slidable in the axial direction of the main shaft 41.

The friction clutch 46 is preferably disengaged or engaged by the clutch actuator 70. The clutch actuator 70 is preferably an electric motor in the present preferred embodiment, but is not limited thereto. Driving the clutch actuator 70 allows the friction plates 445 and the clutch plates 449 to be close to, and thus to be in contact with, each other. Driving the clutch actuator 70 also allows the friction plates 445 and the clutch plates 449 to be separated from, and thus to be distanced from, each other. In this manner, the friction clutch 46 can be disengaged or engaged.

Figure 4:
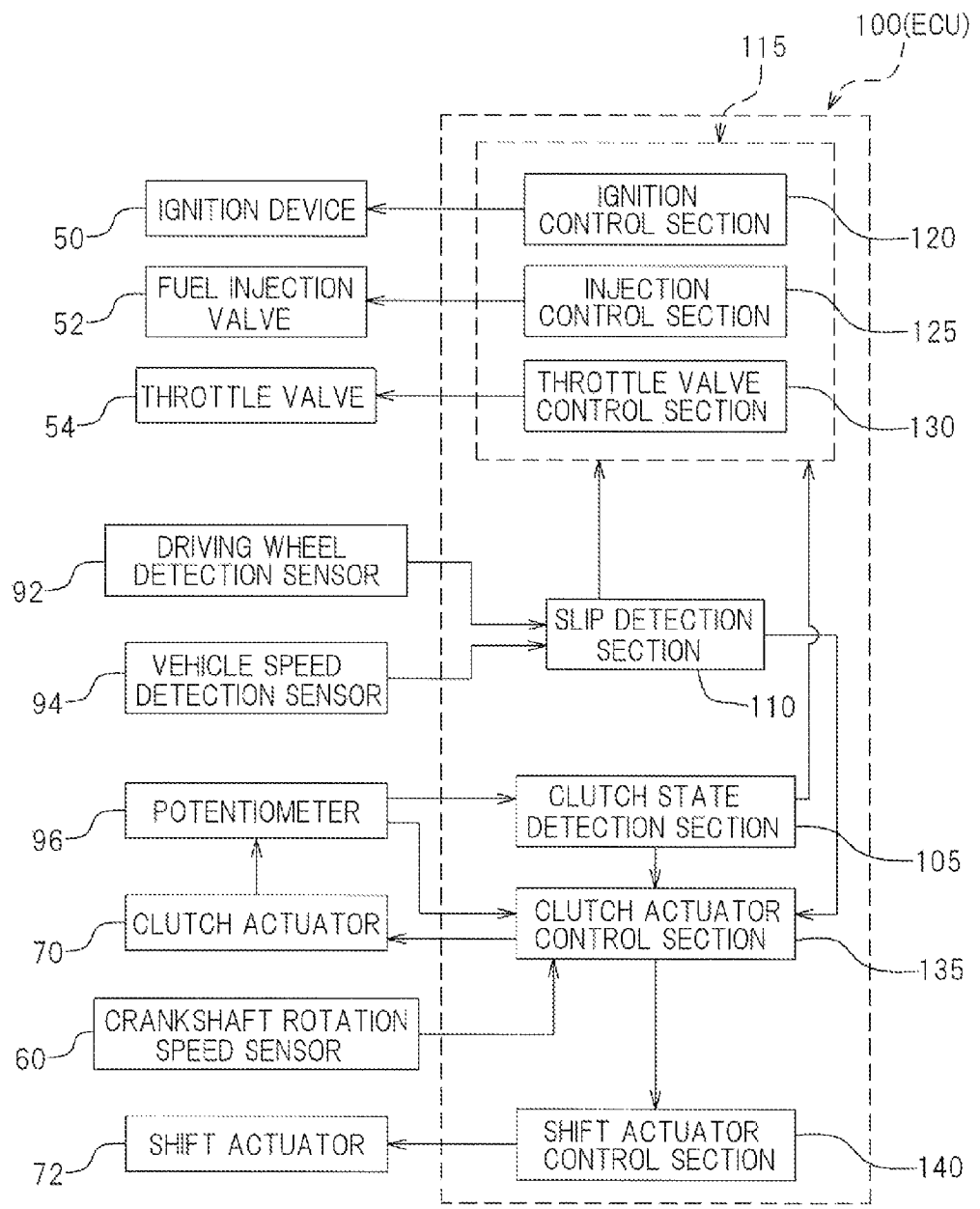
FIG. 4 is a block diagram showing a portion of the elements of a motorcycle according to a preferred embodiment of the present invention.

The clutch actuator 70 is provided with a potentiometer 96 (see FIG. 4). The potentiometer 96 is a clutch actuator sensor arranged to detect a driving amount of the clutch actuator 70. The potentiometer 96 detects a rotation angle or a rotation position of the clutch actuator 70. The clutch actuator 70 and the clutch actuator sensor may be integrated together if so desired. An example of such an integrated clutch actuator 70 is a servo motor which is arranged to detect a rotation angle and a rotation position.

When the clutch actuator 70 is driven, a space 467 enclosed by the piston 463 and the cylinder main body 465 is supplied with hydraulic oil. A change of the driving force of the clutch actuator 70 adjusts the oil pressure of the hydraulic oil supplied to the space 467 in the cylinder main body 465. When the space 467 is supplied with the hydraulic oil, the piston 463 is pushed and moved rightward in FIG. 3. Thus, the piston 463 pushes the pressure plate 451 rightward in FIG. 3 via the push rod 461, the ball 459, the push rod 455 and the bearing 457. When the rightward (in FIG. 3) pushing force applied to the pressure plate 451 via the piston 463 is increased, the press portion 451B of the pressure plate 451 is separated from the friction plates 445. As a result, the friction clutch 46 is put into a disengaged state. In the state where the press portion 451B is separated from the plate group 442, each friction plate 445 and each clutch plate 449 are separated from each other, and a small gap is provided between each friction plate 445 and each clutch plate 449. Therefore, no friction force to convey a torque is generated between each friction plate 445 and each clutch plate 449.

For driving the clutch actuator 70 to engage the friction clutch 46, the pushing force applied to the pressure plate 451 via the piston 463 is decreased and, as a result, the pressure plate 451 is moved leftward in FIG. 3 by the spring 450. When the pressure plate 451 is moved leftward in FIG. 3, the press portion 451B presses the plate group 442 leftward. As a result, the friction clutch 46 is put into a half clutch state. Specifically, each friction plate 445 and each clutch plate 449 contact each other and rotate with respect to each other. As a result, the torque of the engine 45 is conveyed to the main shaft 41 via the friction plates 445 and the clutch plates 449. As seen from this, the "half clutch state" of the friction clutch 46 refers to a state where a portion of the torque of the engine 45 is conveyed to the main shaft 41 via the friction clutch 46 while each friction plate 445 and each clutch plate 449 of the friction clutch 46 rotate with respect to each other. Specifically, the "half clutch state" of the friction clutch 46 refers to a state where the clutch housing 443 (friction plates 445) and the clutch boss 447 (clutch plates 449) are in contact with each other while the difference between the rotation speed of the clutch housing 443 (friction plates 445) and the rotation speed of the clutch boss 447 (clutch plates 449) (the difference will be referred to as the "clutch rotation speed difference of the friction clutch 46") is not zero.

When the clutch actuator 70 is driven to further decrease the pushing force applied to the pressure plate 451, the pressure plate 451 is moved further leftward in FIG. 3 by the spring 450. As a result, each friction plate 445 and each clutch plate 449 of the plate group 442 are put into pressure contact with each other. Specifically, the friction clutch 46 is put into an engaged state, and each friction plate 445 and each clutch plate 449 rotate integrally together.

As described above, the pressure plate 451 moves in one direction or the other direction along the axial direction of the main shaft 41 in accordance with which of the pushing force applied to the pressure plate 451 by the driving of the clutch actuator 70 and the urging force of the spring 450 is larger. In accordance with such a movement, the friction clutch 46 is put into an engaged state, a half clutch state or a disengaged state.

At the crankshaft 25 of the engine 45, a gear 27 is integrally supported. At the main shaft 41, a gear 441 meshing together with the gear 27 is supported. The gear 441 is rotatable with respect to the main shaft 41. The gear 441 is preferably provided integrally with, for example, the clutch housing 443. Thus, the torque of the engine 45 is conveyed from the crankshaft 25 via the gear 441 to the clutch housing 443. The torque of the engine 45 is also conveyed from the clutch housing 443 to the clutch boss 447 by a friction force generated between the plurality of friction plates 445 and the plurality of clutch plates 449. The clutch boss 447 and the main shaft 41 integrally rotate together. Specifically, the clutch boss 447 and the main shaft 41 do not rotate with respect to each other. Therefore, when the friction clutch 46 is engaged, the torque of the engine 45 is conveyed to the main shaft 41.

The push rod 455 is not limited to a push rod arranged to push the pressure plate 451 rightward in FIG. 3 by a mechanism inserted through the main shaft 41. For example, the push rod 455 may be a push rod arranged to pull the pressure plate 451 rightward in FIG. 3 by a mechanism provided outward to the pressure plate 451 in the vehicle width direction (rightward in FIG. 3).

The transmission mechanism 43 according to this preferred embodiment is preferably a so-called dog clutch type and also is a stepped transmission mechanism. The transmission mechanism 43 is located on a power transmission path arranged to convey the torque of the engine 45 to the rear wheel 23 (see FIG. 1) at a position between the friction plates 445 of the friction clutch 46 and the rear wheel 23. The transmission mechanism 43 preferably includes transmission gears 49 and 420, a shift cam 421, shift forks 422, a shift actuator 72 and the like described later.

The main shaft 41 preferably includes a plurality of transmission gears 49 attached thereto. By contrast, the drive shaft has a plurality of transmission gears 420 attached thereto corresponding to the plurality of transmission gears 49. Only a selected transmission gear 49 among the plurality of transmission gears 49 and only a selected transmission gear 420 among the plurality of transmission gears 420 are engageable with each other. At least either the transmission gears 49 among the plurality of transmission gears 49 which are not selected, or the transmission gears 420 among the plurality of transmission gears 420 which are not selected, are rotatable with respect to the main shaft 41 or the drive shaft 42. Specifically, at least either the transmission gears 49 among the plurality of transmission gears 49 which are not selected, or the transmission gears 420 among the plurality of transmission gears 420 which are not selected, idle with respect to the main shaft 41 or the drive shaft 42. The conveyance of rotation between the main shaft 41 and the drive shaft 42 is performed only via the selected transmission gear 49 and the selected transmission gear 420 which are gearing with each other.

The transmission gear 49 and the transmission gear 420 are selected by the shift cam 421. An outer circumferential surface of the shift cam 421 includes a plurality of cam grooves 421a defined therein. Each shift fork 422 is attached to each of the cam grooves 421a. Each shift fork 422 is in engagement with a prescribed transmission gear 49 and a prescribed transmission gear 420 for the main shaft 41 and the drive shaft 42. When the shift cam 421 is rotated, the plurality of shift forks 422 are respectively guided by the cam grooves 421a to move in the axial direction of the main shaft 41. In this manner, the transmission gear 49 and the transmission gear 420 which are to be engaged with each other are selected from the transmission gears 49 and the transmission gears 420. Specifically, only a pair of transmission gears, among the plurality of transmission gears 49 and transmission gears 420, which are at positions corresponding to the rotation angle of the shift cam 421 are respectively put into a secured state by a spline with respect to the main shaft 41 and the drive shaft 42. Thus, a gear position in the transmission mechanism 43 is determined. As a result, the conveyance of rotation is performed between the main shaft 41 and the drive shaft 42 at a prescribed gear ratio via the transmission gear 49 and the transmission gear 420. The shift cam 421 is rotated by a prescribed angle by a reciprocating movement of a shift rod 75.

Switching of the transmission gears 49 and 420 in the transmission mechanism 43, namely, the change of the gear position of the transmission mechanism 43 is performed by driving of the shift actuator 72. The shift actuator 72 is preferably an electric motor in the present preferred embodiment, but is not limited thereto. The shift actuator 72 is connected to the shift cam 421 via the shift rod 75. The shift rod 75 is reciprocated by the driving of the shift actuator 72. After the friction clutch 46 starts to be disengaged by the clutch actuator 70, the shift actuator 72 moves the shift rod 75 and thus switches the transmission gears of the transmission mechanism 43. The shift actuator 72 is provided with a potentiometer (not shown). The potentiometer is a shift actuator sensor arranged to detect a driving amount of the shift actuator 72. The potentiometer detects a rotation angle or a rotation position of the shift actuator 72. The shift actuator 72 and the shift actuator sensor may be integrated together. An example of such an integrated shift actuator 72 is a servo motor arranged to detect a rotation angle and a rotation position.

Owing to the above-described structure, when a prescribed pair of transmission gears 49 and 420 are respectively secured to the main shaft 41 and the drive shaft 42 and the friction clutch 46 is put into a half clutch state or an engaged state while the engine 45 is driven, the torque of the engine 45 is conveyed to the main shaft 41 via the friction clutch 46. The conveyance of rotation is performed between the main shaft 41 and the drive shaft 42 at a prescribed gear ratio via the prescribed pair of transmission gears 49 and 420, and thus the drive shaft 42 is rotated. When the drive shaft 42 is rotated, the torque is conveyed by a power conveyance mechanism 47 (see FIG. 1) arranged to connect the drive shaft 42 and the rear wheel 23 (see FIG. 1) to each other, and thus the rear wheel 23 is rotated.

The motorcycle 1 includes the ECU (Electric Control Unit) 100 as a control device arranged and programmed to control the engine 45. As shown in FIG. 4, the ECU 100 preferably includes a clutch state detection section 105, a slip detection section 110, an engine control section 115, a clutch actuator control section 135, and the shift actuator control section 140.

The clutch state detection section 105 is arranged to detect a half clutch state of the friction clutch 46 based on the rotation angle or the rotation position of the clutch actuator 70 which is detected by the potentiometer 96. For example, when the rotation angle of the clutch actuator 70 is equal to or smaller than a prescribed rotation angle θ1, the friction clutch 46 is detected as being in an engaged state. When the rotation angle of the clutch actuator 70 is equal to or larger than a prescribed rotation angle θ2, the friction clutch 46 is detected as being in a disengaged state. When the rotation angle of the clutch actuator 70 is larger than θ1 and smaller than θ2, the friction clutch 46 is detected as being in a half clutch state. In the case where a servo motor arranged to detect the rotation angle and the rotation position is used as the clutch actuator 70, the clutch state detection section 105 can detect the state of the friction clutch 46 based on the rotation angle or the rotation position detected by the servo motor.

The slip detection section 110 is arranged to detect a slip of the rear wheel 23 based on the rotation speed of the rear wheel 23 detected by the driving wheel detection sensor 92 and the vehicle speed detected by the vehicle speed detection sensor 94. The slip detection section 110 is arranged to detect a slip of the rear wheel 23 also based on the rotation speed of the rear wheel 23 detected by the driving wheel detection sensor 92 and the rotation speed of the front wheel 12 detected by the vehicle speed detection sensor 94. The slip detection section 110 detects the slip of the rear wheel 23 when, for example, the difference between the rotation speed of the rear wheel 23 and the rotation speed of the front wheel 12 is larger than a preset value.

The engine control section 115 is arranged and programmed to adjust the output of the engine 45. The engine control section 115 preferably includes an ignition control section 120, an injection control section 125, and a throttle valve control section 130. The ignition control section 120 is arranged and programmed to control the ignition device 50, for example, by giving a pulse signal to the ignition device 50. The injection control section 125 is arranged and programmed to control the fuel injection valve 52, for example, by giving a pulse signal to the fuel injection valve 52. The throttle valve control section 130 is arranged and programmed to control the opening of the throttle valve 54, for example, by driving the throttle driving actuator 56 based on information from the accelerator opening sensor. The engine control section 115 is arranged and programmed to adjust the output of the engine 45 by controlling the ignition device 50, the fuel injection valve 52, and the opening of the throttle valve 54.

When the friction clutch 46 is in an engaged state or a half clutch state and the slip detection section 110 has detected a slip of the rear wheel 23, the engine control section 115 is arranged and programmed to perform control to decrease the output of the engine 45 (hereinafter, referred to also as "traction control"). The traction control may be, for example, control to retard the time of igniting the ignition device 50 (hereinafter, referred to as "ignition retarding control"), control to stop fuel injection or decrease the amount of fuel injection from the fuel injection valve 52 (hereinafter, referred to as "fuel injection amount decreasing control"), control to decrease the opening of the throttle valve 54, or a combination thereof.

The clutch actuator control section 135 is arranged and programmed to control the clutch actuator 70. The clutch actuator 70 can be driven based on, for example, the control of the clutch actuator control section 135. The clutch actuator control section 135 controls the clutch actuator 70 based on the rotation speed of the engine 45. When, for example, the friction clutch 46 is in a half clutch state and a slip of the rear wheel 23 is not detected, the clutch actuator control section 135 controls the clutch actuator 70 so as to engage the friction clutch 46 when the rotation speed of the engine 45 is increased, and controls the clutch actuator 70 so as to disengage the friction clutch 46 when the rotation speed of the engine 45 is decreased.

When the friction clutch 46 is in a half clutch state and a slip of the rear wheel 23 is detected, the clutch actuator control section 135 is arranged and programmed to control the clutch actuator 70 so as to keep the pushing force of the friction clutch 46 at a fixed level (hereinafter, referred to also as "clutch pushing force keeping control"). The pushing force of the friction clutch 46 is a pushing force applied to the pressure plate 451 by the driving of the clutch actuator 70. The pushing force of the friction clutch 46 can be determined, for example, based on the driving force of the clutch actuator 70 or the oil pressure of the hydraulic oil supplied to the space 467 of the cylinder main body 465. The clutch actuator control section 135 keeps the pushing force of the friction clutch 46 at a fixed level, and thus can keep the position of the friction clutch 46 at a fixed position. When the friction clutch 46 is in a half clutch state and a slip of the rear wheel 23 is detected, the clutch actuator control section 135 is arranged and programmed to control the clutch actuator 70 so as to keep the position of the friction clutch 46 at a fixed position. The clutch actuator control section 135 also keeps the oil pressure of the hydraulic oil supplied to the space 467 of the cylinder main body 465 at a fixed level, and thus can keep the pushing force of the friction clutch 46 at a fixed level. When the friction clutch 46 is in a half clutch state and a slip of the rear wheel 23 is detected, the clutch actuator control section 135 controls the clutch actuator 70 so as to keep the oil pressure of the hydraulic oil supplied to the space 467 of the cylinder main body 465 at a fixed level, and thus can keep the pushing force of the friction clutch 46 at a fixed level.

The position of the friction clutch 46 can preferably be indirectly determined based on the rotation angle or the rotation position detected by the potentiometer 96 provided to the clutch actuator 70. The position of the friction clutch 46 can also be determined, for example, by providing a clutch position detection sensor arranged to detect the position of the friction clutch 46. For example, the clutch position detection sensor can be provided to the pressure plate 451 to directly detect the position of the pressure plate 451, so that the position of the friction clutch 46 is detected. The expression "keep the position of the friction clutch 46 at a fixed position" refers to a state where the pushing force applied to the pressure plate 451 by the driving of the clutch actuator 70 and the urging force of the spring 450 are equal to each other and thus the pressure plate 451 of the friction clutch 46 is not moved from a prescribed position.

Preferably, when the friction clutch 46 is in a half clutch state and a slip of the rear wheel 23 is detected, the clutch actuator control section 135 is arranged and programmed to control the clutch actuator 70 so as to keep the pushing force of the friction clutch 46 at a level thereof at the time when the slip of the rear wheel 23 is detected. The pushing force of the friction clutch 46 may be a pushing force that is predefined regardless of the pushing force of the friction clutch 46 at the time when the slip of the rear wheel 23 is detected. When the friction clutch 46 is in a half clutch state and a slip of the rear wheel 23 is detected, the clutch actuator control section 135 can also control the clutch actuator 70 so as to keep the position of the friction clutch 46 at a position thereof at the time when the slip of the rear wheel 23 is detected. The position at which the friction clutch 46 is kept may be, for example, a position thereof when a prescribed time duration passes after the slip of the rear wheel 23 is detected while the friction clutch 46 is in a half clutch state.

When the clutch rotation speed difference of the friction clutch 46 becomes substantially zero, the clutch actuator control section 135 is arranged and programmed to engage the friction clutch 46. The clutch rotation speed difference of the friction clutch 46 is the rotation speed difference between the clutch housing 443 (friction plates 445) and the clutch boss 447 (clutch plates 449), and is the same as the difference between the rotation speed of the engine 45 (rotation speed of the crankshaft 25) and the rotation speed of the main shaft 41. The clutch rotation speed difference can be calculated by use of the rotation speed of the crankshaft 25 detected by the crankshaft rotation speed sensor 60 and the rotation speed of the main shaft 41 detected by the main shaft rotation speed sensor 61.

When the clutch rotation speed difference of the friction clutch 46 becomes substantially zero while the clutch actuator control section 135 controls the clutch actuator 70 so as to keep the pushing force of the friction clutch 46 at a fixed level, the clutch actuator control section 135 stops controlling the clutch actuator 70 so as to keep the pushing force of the friction clutch 46 at a fixed level and controls the clutch actuator 70 so as to engage the friction clutch 46. The clutch actuator control section 135 operates in substantially the same manner while controlling the clutch actuator 70 so as to keep the position of the friction clutch 46 at a fixed position.

When the rotation speed of the engine 45 becomes equal to or lower than a prescribed rotation speed, the clutch actuator control section 135 is arranged and programmed to disengage the friction clutch 46. Even while the clutch actuator control section 135 controls the clutch actuator 70 so as to keep the pushing force of the friction clutch 46 at a fixed level, when the rotation speed of the engine 45 becomes equal to or lower than a prescribed rotation speed, the clutch actuator control section 135 stops controlling the clutch actuator 70 so as to keep the pushing force of the friction clutch 46 at a fixed level and controls the clutch actuator 70 so as to disengage the friction clutch 46. As a result, engine stall can be prevented. The clutch actuator control section 135 operates in substantially the same manner while controlling the clutch actuator 70 so as to keep the position of the friction clutch 46 at a fixed position.

The shift actuator control section 140 controls the shift actuator 72. The shift actuator 72 can be driven based on the control by the shift actuator control section 140. The shift actuator control section 140 drives the shift actuator 72 based on a gear change instruction from the rider. After the friction clutch 46 starts to be disengaged by the clutch actuator 70, the shift actuator control section 140 drives the transmission mechanism 43 by use of the shift actuator 72.

The motorcycle 1 according to a preferred embodiment of the present invention preferably includes at least a traction control device, a clutch state detection device, a clutch actuator control device, and a clutch rotation speed difference detection device. The traction control device preferably includes at least the slip detection section 110 and the engine control section 115. The clutch state detection device preferably includes at least the potentiometer 96 and the clutch state detection section 105. The clutch actuator control device preferably includes at least the clutch actuator control section 135 and the clutch actuator 70. The clutch rotation speed difference detection device preferably includes at least the crankshaft rotation speed sensor 60 and the main shaft rotation speed sensor 61.

Figure 5:
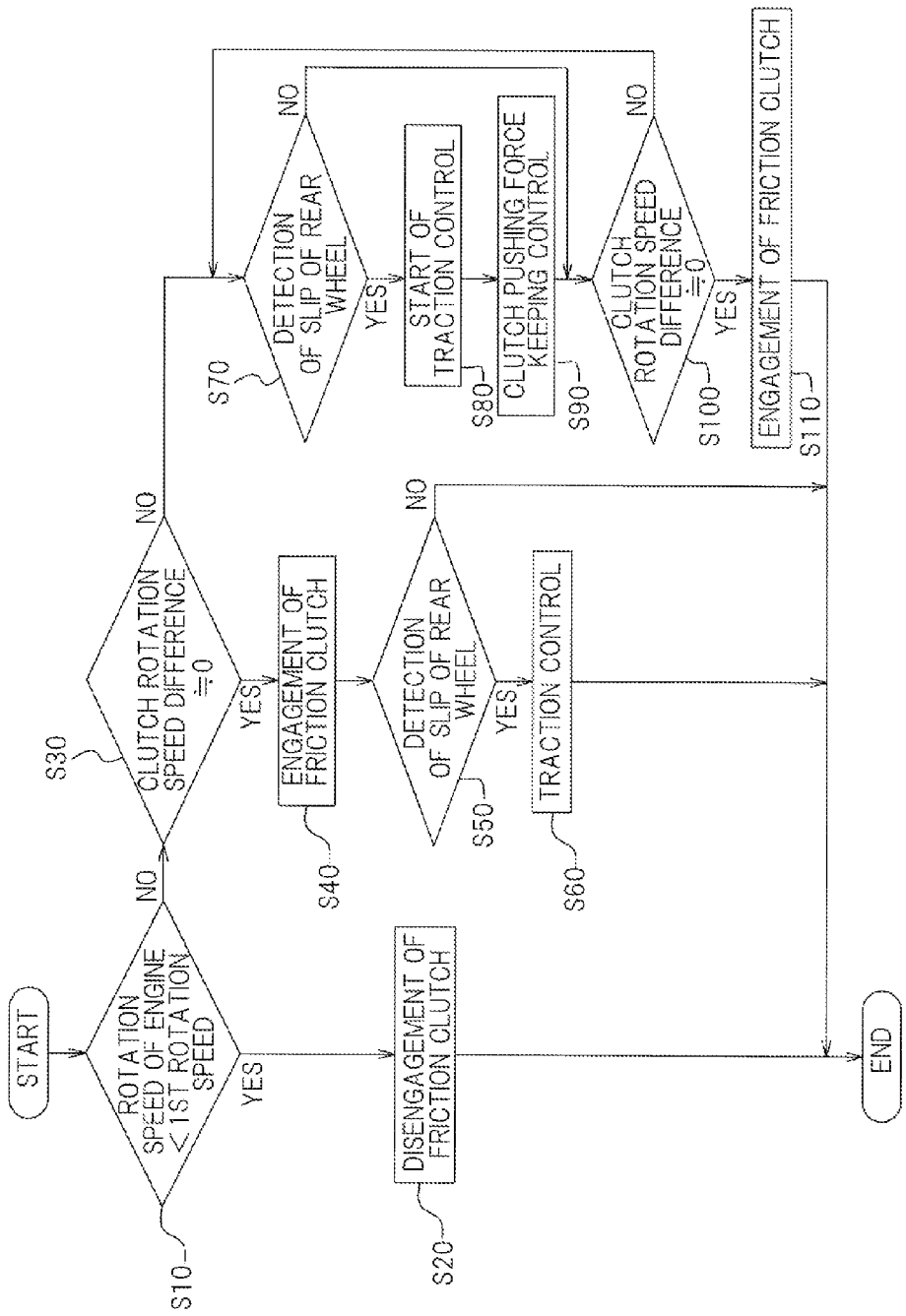
FIG. 5 is a flowchart showing control performed at the time of starting of a motorcycle according to a preferred embodiment of the present invention.
Figure 6:
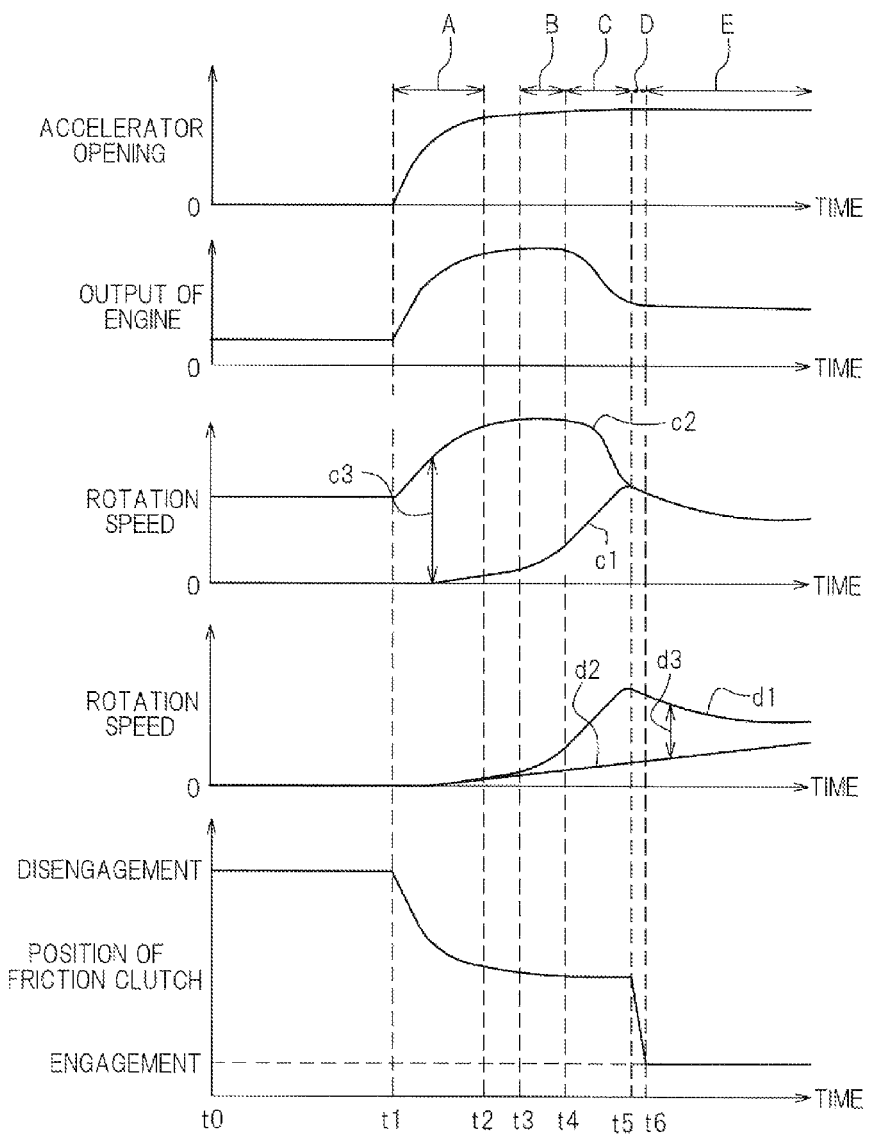
FIG. 6 is a timing diagram on a clutch pushing force keeping control performed on a motorcycle according to a preferred embodiment of the present invention.

Now, with reference to FIG. 5 and FIG. 6, control of the motorcycle 1 according to the present preferred embodiment at the time of starting will be described. FIG. 5 is a flowchart showing the control of the motorcycle 1 according to the present preferred embodiment at the time of starting. It should be noted that the flowchart in FIG. 5 is also applicable to control at the time of gear change during running. FIG. 6 is a timing diagram regarding the clutch pushing force keeping control of the motorcycle 1 according to the present preferred embodiment. Before starting (see time t0 in FIG. 6), the motorcycle 1 is at a stop, and the rotation speed of the engine 45 is an idle rotation speed. The "idle rotation speed" refers to the rotation speed of the engine 45 in a load-free state when the motorcycle 1 is at a stop. FIG. 6 is a timing diagram of an operation performed at the time of starting of the motorcycle 1, but the control to maintain the clutch position of the motorcycle 1 according to this preferred embodiment may be performed at the time of a gear change, namely, at the time of switching of the transmission gear.

When the rider operates the shift switch at the time of starting of the motorcycle 1, the clutch actuator control section 135 is arranged and programmed to drive the clutch actuator 70 to disengage the friction clutch 46. After the friction clutch 46 starts to be disengaged, the shift actuator control section 140 is arranged and programmed to drive the shift actuator 72 to change the gear position of the transmission mechanism 43 to the first gear. When the rider operates the accelerator operator to increase the accelerator opening at time t1 in FIG. 6, the rotation speed of the engine 45 (crankshaft 25) (see reference character c2 in FIG. 6) is increased (see an area of reference character A in FIG. 6). As the rotation speed of the engine 45 increases, the clutch actuator control section 135 moves the friction clutch 46 from the disengagement position toward the engagement position. At time t1, half clutch control to engage the friction clutch 46 is gradually started. When the friction clutch 46 is put into the half clutch state from the disengaged state, the torque of the engine 45 is conveyed to the main shaft 41 via the friction clutch 46. Thus, the torque of the engine 45 is conveyed to the rear wheel 23, and the motorcycle 1 starts the starting operation.

If the half clutch state of the friction clutch 46 is continued when the rotation speed of the engine 45 is low, there is an undesirable possibility that engine stall is caused. In order to avoid this, in step S10, the ECU 100 determines whether the rotation speed of the engine 45 detected by the crankshaft rotation speed sensor 60 is lower than a first rotation speed or not. When the rotation speed of the engine 45 is lower than the first rotation speed, the control advances to step S20. By contrast, when the rotation speed of the engine 45 is equal to or higher than the first rotation speed, the control advances to step S30. As the first rotation speed, the idle rotation speed described above, for example, can be set.

In step S20, the clutch actuator control section 135 drives the clutch actuator 70 to disengage the friction clutch 46. As a result, engine stall can be prevented. When the friction clutch 46 is disengaged in step S20, the control shown in FIG. 5 is finished. Usually, the vehicle is restarted after this.

After the half clutch control is started at time t1, the clutch rotation speed difference (see reference character c3 in FIG. 6) is decreased gradually. In step S30, the ECU 100 determines whether the clutch rotation speed difference of the friction clutch 46 is substantially zero or not (see time t2 in FIG. 6) based on the rotation speed of the crankshaft 25 detected by the crankshaft rotation speed sensor 60 and the rotation speed of the main shaft 41 detected by the main shaft rotation speed sensor 61 (see reference character c1 in FIG. 6). When the clutch rotation speed difference is substantially zero, the control advances to step S40 in order to finish the half clutch control. By contrast, when the clutch rotation speed difference is not substantially zero, it is regarded that the half clutch state is continued and the control advances to step S70.

In step S40, since the clutch rotation speed difference is substantially zero, the clutch actuator control section 135 drives the clutch actuator 70 to engage the friction clutch 46. Specifically, the clutch actuator control section 135 finishes the half clutch control and quickly engages the friction clutch 46.

In step S50, the ECU 100 determines whether a slip of the rear wheel 23 is detected or not. In more detail, the ECU 100 determines whether the slip detection section 110 has detected a slip of the rear wheel 23 or not based on the rotation speed of the rear wheel 23 detected by the driving wheel detection sensor 92 (see reference character d1 in FIG. 6) and the rotation speed of the front wheel 12 detected by the vehicle speed detection sensor 94 (see reference character d2 in FIG. 6). When the slip detection section 110 has detected the slip of the rear wheel 23, the control advances to step S60.

By contrast, when the slip of the rear wheel 23 is not detected by the slip detection section 110, it is regarded that the motorcycle 1 has started in a satisfactory manner and the control on start is finished.

In step S60, since the slip detection section 110 has detected the slip of the rear wheel 23, the engine control section 115 performs the traction control. Specifically, the engine control section 115 executes at least one of the ignition retarding control on the ignition device 50, the fuel injection amount decreasing control on the fuel injection valve 52, and the control to decrease the opening of the throttle valve 54, and thus decreases the output of the engine 45. As a result, the torque conveyed to the rear wheel 23 is decreased, and therefore the increase of the slip can be suppressed and prevented. When the traction control in step S60 is finished, the control shown in FIG. 5 is finished. As a result, the slip of the rear wheel 23 is resolved, and the motorcycle 1 finishes the starting operation.

As described above, when the determination result of step S30 is No, the friction clutch 46 is in a half clutch state. In step S70, the ECU 100 determines whether or not a slip of the rear wheel 23 is detected while the friction clutch 46 is in a half clutch state. In more detail, the ECU 100 determines whether or not the slip detection section 110 has detected a slip of the rear wheel 23 based on the rotation speed of the rear wheel 23 detected by the driving wheel detection sensor 92 and the vehicle speed detected by the vehicle speed detection sensor 94. When the slip detection section 110 has detected the slip of the rear wheel 23 (see an area of reference character B in FIG. 6), the control advance to step S80. By contrast, when the slip of the rear wheel 23 is not detected by the slip detection section 110, the control advances to step S100. In the example shown in FIG. 6, the rear wheel 23 slips at time t3.

In step S80, since the slip detection section 110 has detected the slip of the rear wheel 23 (see the area of reference character B in FIG. 6), the engine control section 115 starts the traction control (see time t4 in FIG. 6). Specifically, the engine control section 115 executes at least one of the ignition retarding control on the ignition device 50, the fuel injection amount decreasing control on the fuel injection valve 52, and the control to decrease the opening of the throttle valve 54, and thus starts decreasing the output of the engine 45. As a result, the output and the rotation speed of the engine 45 are rapidly decreased (see an area of reference character C in FIG. 6), and therefore an increase of the amount of slip of the rear wheel 23 (difference between the rotation speed of the rear wheel 23 and the rotation speed of the front wheel 12; see reference character d3 in FIG. 6) can be suppressed and prevented.

After the processing of step S80, the control advances to step S90. In step S90, the friction clutch 46 is in a half clutch state and the slip detection section 110 has detected the slip of the rear wheel 23, and thus the engine control section 115 performs the traction control. Therefore, the clutch actuator control section 135 starts controlling the clutch actuator 70 so as to keep the pushing force of the friction clutch 46 at a fixed level (clutch pushing force keeping control) (see time t4 in FIG. 6). As a result, the position of the friction clutch 46 is kept at a fixed position and a change of the clutch position within a short time is suppressed and prevented. Therefore, generation of vibration based on the hunting of the clutch position can be suppressed and prevented. In addition, the rotation speed difference of the friction clutch 46 is resolved swiftly (see the area of reference character C in FIG. 6).

In step S100, the ECU 100 determines whether the clutch rotation speed difference of the friction clutch 46 is substantially zero or not based on the rotation speed of the crankshaft 25 detected by the crankshaft rotation speed sensor 60 and the rotation speed of the main shaft 41 detected by the main shaft rotation speed sensor 61. When the clutch rotation speed difference is substantially zero, the control advances to step S110 in order to finish the half clutch control. By contrast, when the clutch rotation speed difference is not substantially zero, the control returns to step S70.

In step S110, since the clutch rotation speed difference is substantially zero (see time t5 in FIG. 6), the clutch actuator control section 135 drives the clutch actuator 70 to engage the friction clutch 46 (see an area of reference character D in FIG. 6). The pushing force of the friction clutch 46 is kept at a fixed level, and thus the position of the friction clutch 46 is kept at a fixed position. Therefore, the friction clutch 46 can be engaged swiftly (see time t6 in FIG. 6), and the amount of slip can be decreased swiftly. In an area of reference character E in FIG. 6, the motorcycle 1 finishes the starting operation. In the motorcycle 1 which has finished the starting operation, the friction clutch 46 is in an engaged state. Therefore, the decrease of the output and the decrease of the rotation speed of the engine 45 can be conveyed to the rear wheel 23 as they are. Thus, the slip of the rear wheel 23 is resolved. When the slip of the rear wheel 23 is resolved, the engine control section 115 finishes the traction control. After the traction control is finished, the engine control section 115 controls the ignition device 50, the fuel injection valve 52, and the opening of the throttle valve 54, and thus adjusts the output of the engine 45.

As described above, in the motorcycle 1 according to the present preferred embodiment, when the friction clutch 46 is in a half clutch state and a slip of the rear wheel 23 is detected, the engine control section 115 executes the control to decrease the output of the engine 45. Therefore, an increase in the amount of slip can be suppressed and prevented. In addition, when the friction clutch 46 is in a half clutch state and a slip of the rear wheel 23 is detected, the clutch actuator control section 135 controls the clutch actuator 70 so as to keep the pushing force of the friction clutch 46 at a fixed level. As a result, even if the output and the rotation speed of the engine 45 continue decreasing, the friction clutch 46 is kept at a fixed position. Therefore, the friction clutch 46 can be engaged swiftly. As a result, the decrease of the output of the engine 45 can be conveyed to the rear wheel 23 quickly, and thus the amount of slip of the rear wheel 23 can be swiftly decreased. In this manner, when the friction clutch 46 is in a half clutch state and a slip of the rear wheel 23 is detected, the clutch actuator 70 is controlled so as to keep the pushing force of the friction clutch 46 at a fixed level. Therefore, the position of the friction clutch 46 is not changed, and vibration based on the hunting of the clutch position is not generated. In addition, since the friction clutch 46 can be engaged swiftly, the amount of slip of the rear wheel 23 can be swiftly decreased.

According to the present preferred embodiment, when the friction clutch 46 is in a half clutch state and a slip of the rear wheel 23 is detected, the clutch actuator control section 135 controls the clutch actuator 70 so as to keep the pushing force of the friction clutch 46 at a level thereof at the time when the slip of the rear wheel 23 is detected. As a result, the friction clutch 46 can be engaged swiftly by the output and the rotation speed of the engine 45 being kept decreasing. As a result, the decrease of the output of the engine 45 can be conveyed to the rear wheel 23 quickly, and thus the amount of slip of the rear wheel 23 can be swiftly decreased.

According to the present preferred embodiment, the motorcycle 1 preferably further includes the cylinder main body 465 arranged to drive the clutch actuator 70 to generate an oil pressure. When the friction clutch 46 is in a half clutch state and a slip of the rear wheel 23 is detected, the clutch actuator control section 135 controls the clutch actuator 70 so as to keep the oil pressure of the cylinder main body 465 at a fixed level, and thus keeps the pushing force of the friction clutch 46 at a fixed level. In this manner, the oil pressure of the cylinder main body 465 is kept at a fixed level, and thus the pushing force of the friction clutch 46 can be kept at a fixed level.

According to the present preferred embodiment, when the friction clutch 46 is in a half clutch state and a slip of the rear wheel 23 is detected, the clutch actuator control section 135 is arranged and programmed to control the clutch actuator 70 so as to keep the position of the friction clutch 46 at a fixed position. As a result, the friction clutch 46 can be engaged swiftly by the output and the rotation speed of the engine 45 being kept decreasing. As a result, the decrease of the output of the engine 45 can be conveyed to the rear wheel 23 quickly, and thus, the amount of slip of the rear wheel 23 can be swiftly decreased.

According to the present preferred embodiment, when the friction clutch 46 is in a half clutch state and a slip of the rear wheel 23 is detected, the clutch actuator control section 135 is arranged and programmed to control the clutch actuator 70 so as to keep the position of the friction clutch 46 at a position thereof at the time when the slip is detected. As a result, the friction clutch 46 can be engaged swiftly by the output and the rotation speed of the engine 45 being kept decreasing. As a result, the decrease of the output of the engine 45 can be conveyed to the rear wheel 23 quickly, and thus the amount of slip of the rear wheel 23 can be swiftly decreased.

According to this preferred embodiment, the friction clutch 46 preferably includes the friction plates 445 to which the torque of the engine 45 is conveyed and the clutch plates 449 which can be put into contact with, and can be separated from, the friction plates 445. In addition, the motorcycle 1 preferably includes the crankshaft rotation speed sensor 60 and the main shaft rotation speed sensor 61 which are used to detect the rotation speed difference between the friction plates 445 and the clutch plates 449 of the friction clutch 46. When the clutch rotation speed difference between the friction plates 445 and the clutch plates 449 of the friction clutch 46 becomes substantially zero while the clutch actuator control section 135 controls the clutch actuator 70 so as to keep the pushing force of the friction clutch 46 at a fixed level, the clutch actuator control section 135 stops controlling the clutch actuator 70 so as to keep the pushing force of the friction clutch 46 at a fixed level and controls the clutch actuator 70 so as to engage the friction clutch 46. In this manner, when the rotation speed of the friction plates 445 and the rotation speed of the clutch plates 449 of the friction clutch 46 become substantially equal to each other, the control to maintain the pushing force of the friction clutch 46 at a fixed level is stopped and the control to engage the friction clutch 46 is performed promptly. Thus, the decrease of the output of the engine 45 can be conveyed to the rear wheel 23 quickly. As a result, the amount of slip of the rear wheel 23 can be swiftly decreased.

According to the present preferred embodiment, the motorcycle 1 preferably further includes the crankshaft rotation speed sensor 60 arranged to detect the rotation speed of the engine 45. When the rotation speed of the engine 45 becomes equal to or lower than a prescribed value while the clutch actuator control section 135 controls the clutch actuator 70 so as to keep the pushing force of the friction clutch 46 at a fixed level, the clutch actuator control section 135 stops controlling the clutch actuator 70 so as to keep the pushing force of the friction clutch 46 at a fixed level and controls the clutch actuator 70 so as to disengage the friction clutch 46. In this manner, when the rotation speed of the engine 45 becomes equal to or lower than a prescribed value, the control to maintain the pushing force of the friction clutch 46 at a fixed level is stopped and the control to disengage the friction clutch 46 is performed. Thus, engine stall can be prevented.

According to the present preferred embodiment, in the case where the friction clutch 46 is in a half clutch state and a slip of the rear wheel 23 is not detected, the clutch actuator control section 135 controls the clutch actuator 70 so as to engage the friction clutch 46 when the rotation speed of the engine 45 is increased, and controls the clutch actuator 70 so as to disengage the friction clutch 46 when the rotation speed of the engine 45 is decreased. As a result, the friction clutch 46 can be engaged and disengaged easily.

According to the present preferred embodiment, the motorcycle 1 preferably includes the stepped transmission mechanism 43 and the shift actuator 72 arranged to drive the transmission mechanism 43. Since the gear position of the transmission mechanism 43 can be changed by the shift actuator 72, the operability for the rider is improved. If hunting of the clutch position occurs when the transmission mechanism 43 is controlled by the shift actuator 72, this may adversely influence the change of the gear position of the transmission mechanism 43. However, in the present preferred embodiment, the hunting of the clutch position does not occur. Therefore, even when the transmission mechanism 43 is controlled by the shift actuator 72, the change of the gear position of the transmission mechanism 43 is not adversely influenced.

According to the present preferred embodiment, the motorcycle 1 preferably includes the shift actuator control section 140 arranged to drive the transmission mechanism 43 by use of the shift actuator 72 after the friction clutch 46 starts to be disengaged by the clutch actuator 70. As a result, the change of the gear position can be performed in a satisfactory manner.

The motorcycle 1 according to the present preferred embodiment preferably includes the electronically controllable throttle valve 54. When a slip of the rear wheel 23 is detected, the engine control section 115 can execute the control to decrease the opening of the throttle valve 54 to decrease the output of the engine 45. In this manner, the opening of the throttle valve 54 is decreased, and thus the output of the engine 45 can be decreased easily.

The motorcycle 1 according to the present preferred embodiment preferably includes the ignition device 50. When a slip of the rear wheel 23 is detected, the engine control section 115 can execute the ignition retarding control on the ignition device 50 to decrease the output of the engine 45. In this manner, the time of igniting the ignition device 50 is retarded, and thus the output of the engine 45 can be easily decreased.

The motorcycle 1 according to the present preferred embodiment preferably includes the fuel injection valve 52. When a slip of the rear wheel 23 is detected, the engine control section 115 is arranged to execute the fuel injection amount decreasing control on the fuel injection valve 52 to decrease the output of the engine 45. In this manner, fuel injection from the fuel injection valve 52 is stopped or the amount of fuel injection is decreased, and thus the output of the engine 45 can be easily decreased.

According to the present preferred embodiment, the motorcycle 1 preferably includes the front wheel 12 rotating in accordance with the running of the motorcycle 1, and the vehicle speed detection sensor 94 includes a sensor arranged to detect the rotation speed of the front wheel 12. As a result, the slip detection sensor 110 is arranged to detect a slip of the rear wheel 23 based on the rotation speed of the front wheel 12 detected by the vehicle speed detection sensor 94 and the rotation speed of the rear wheel 23 detected by the driving wheel detection sensor 92.

It should be noted that the state represented by the expression "keep the pushing force at a fixed level" as discussed above is not limited to a state where the pushing force is kept precisely at a fixed level and also encompasses a state where the pushing force is slightly varied in such a range that the above-described functions and effects are provided. Also, the state represented by the expression "keep at a fixed position" as discussed above is not limited to a state where the position is kept precisely at a fixed position and encompasses a state where the position is slightly varied in such a range that the above-described functions and effects are provided. Finally, the expression "at the time of starting of the vehicle (motorcycle 1)" as discussed above refers to the time when the vehicle (motorcycle 1) starts running from the state of having a vehicle speed of zero (i.e., the state where the vehicle is at a stop).

In the vehicle according to the present preferred embodiment, the clutch actuator control section 135 preferably is arranged and programmed to control the clutch actuator 70 based on the rotation speed of the engine 45. However, the clutch actuator control section 135 is not limited to this. For example, the clutch actuator control section 135 may alternatively be arranged and programmed to control the clutch actuator 70 based on the vehicle speed detected by the vehicle speed detection sensor 94, the opening of the throttle valve 54 detected by the throttle position sensor 66, the accelerator opening detected by the accelerator opening sensor, the rotation speed of the engine 45 and the like, for example. As long as there is no change other than the change of the rotation speed of the engine 45, in the case where the friction clutch 46 is in a half clutch state and a slip of the rear wheel 23 is not detected, the clutch actuator control section 135 controls the clutch actuator 70 so as to engage the friction clutch 46 when the rotation speed of the engine 45 is increased, and controls the clutch actuator 70 so as to disengage the friction clutch 46 when the rotation speed of the engine 45 is decreased. By contrast, in the case where there is a change other than the change of the rotation speed of the engine 45 and the friction clutch 46 is in a half clutch state and a slip of the rear wheel 23 is not detected, the clutch actuator control section 135 may control the clutch actuator 70 so as to disengage the friction clutch 46 when the rotation speed of the engine 45 is increased, and may control the clutch actuator 70 so as to engage the friction clutch 46 when the rotation speed of the engine 45 is decreased.

The vehicle according to the preferred embodiments of the present invention is not limited to a vehicle arranged to execute semi-automatic control to automatically performing the gear change based on an intention of the rider, and may alternatively be a vehicle arranged to execute full-automatic control to automatically performing the gear change in accordance with the driving state of the vehicle, regardless of the intention of the rider. Instead of the clutch actuator 70 and the shift actuator 72 being provided separately, a single actuator arranged to drive the friction clutch 46 and the transmission mechanism 43 may be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
an engine;
a driving wheel arranged to be driven by the engine;
a friction clutch located between the engine and the driving wheel;
a clutch actuator arranged to disengage and engage the friction clutch;
a clutch state detection device arranged to detect a half clutch state of the friction clutch;
a driving wheel detection sensor arranged to detect a rotation speed of the driving wheel;
a vehicle speed detection sensor arranged to detect a vehicle speed;
a traction control device including a slip detection section arranged and programmed to detect a slip of the driving wheel based on the rotation speed of the driving wheel detected by the driving wheel detection sensor and the vehicle speed detected by the vehicle speed detection sensor, and an engine control section arranged and controlled to perform control to decrease an output of the engine when the slip of the driving wheel is detected by the slip detection section; and
a clutch actuator control device arranged and programmed to control the clutch actuator based on a rotation speed of the engine; wherein
when the friction clutch is in a half clutch state and the slip of the driving wheel is detected, the clutch actuator control device is arranged and programmed to control the clutch actuator so as to maintain a pushing force of the friction clutch at a fixed or substantially fixed level.

2. The vehicle according to claim 1, wherein when the friction clutch is in a half clutch state and the slip of the driving wheel is detected, the clutch actuator control device is arranged and programmed to control the clutch actuator so as to maintain the pushing force of the friction clutch at a level thereof at the time when the slip is detected.

3. The vehicle according to claim 1, further comprising a hydraulic cylinder arranged to generate an oil pressure by driving the clutch actuator, wherein when the friction clutch is in a half clutch state and the slip of the driving wheel is detected, the clutch actuator control device is arranged and programmed to control the clutch actuator so as to maintain the oil pressure of the hydraulic cylinder at a fixed level and to maintain the pushing force of the friction clutch at a fixed level.

4. The vehicle according to claim 1, wherein when the friction clutch is in a half clutch state and the slip of the driving wheel is detected, the clutch actuator control device is arranged and programmed to control the clutch actuator so as to maintain a position of the friction clutch at a fixed position.

5. The vehicle according to claim 1, wherein when the friction clutch is in a half clutch state and the slip of the driving wheel is detected, the clutch actuator control device is arranged and programmed to control the clutch actuator so as to maintain a position of the friction clutch at a position thereof at the time when the slip is detected.

6. The vehicle according to claim 1, wherein:
the friction clutch includes a driving-side rotation body to which a torque of the engine is conveyed and a subordinate-side rotation body arranged to be both contacted with and separated from, the driving-side rotation body;
the vehicle further comprises a clutch rotation speed difference detection device arranged to detect a rotation speed difference between the driving-side rotation body and the subordinate-side rotation body of the friction clutch; and
when the rotation speed difference between the driving-side rotation body and the subordinate-side rotation body of the friction clutch becomes substantially zero while the clutch actuator control device controls the clutch actuator so as to maintain the pushing force of the friction clutch at a fixed level, the clutch actuator control device is arranged and programmed to stop controlling the clutch actuator so as to maintain the pushing force of the friction clutch at a fixed level and controls the clutch actuator so as to engage the friction clutch.

7. The vehicle according to claim 1, further comprising an engine rotation speed sensor arranged to detect the rotation speed of the engine, wherein when the rotation speed of the engine becomes equal to or lower than a prescribed value while the clutch actuator control device controls the clutch actuator so as to maintain the pushing force of the friction clutch at a fixed or substantially fixed level, the clutch actuator control device stops controlling the clutch actuator so as to maintain the pushing force of the friction clutch at a fixed or substantially fixed level and controls the clutch actuator so as to disengage the friction clutch.

8. The vehicle according to claim 1, wherein when the friction clutch is in a half clutch state and the slip of the driving wheel is not detected, the clutch actuator control device is arranged and programmed to control the clutch actuator so as to engage the friction clutch when the rotation speed of the engine is increased and controls the clutch actuator so as to disengage the friction clutch when the rotation speed of the engine is decreased.

9. The vehicle according to claim 1, further comprising:
a stepped transmission mechanism; and
a shift actuator arranged to drive the transmission mechanism.

10. The vehicle according to claim 9, further comprising a shift actuator control device arranged to drive the transmission mechanism by use of the shift actuator after the friction clutch starts to be disengaged by the clutch actuator.

11. The vehicle according to claim 1, further comprising an electronically controllable throttle valve, wherein, when the slip of the driving wheel is detected, the engine control section of the traction control device is arranged and programmed to execute control to decrease an opening of the throttle valve.

12. The vehicle according to claim 1, further comprising an ignition device, wherein, when the slip of the driving wheel is detected, the engine control section of the traction control device is arranged and programmed to execute ignition retarding control on the ignition device.

13. The vehicle according to claim 1, further comprising a fuel injection device, wherein, when the slip of the driving wheel is detected, the engine control section of the traction control device is arranged and programmed to execute fuel injection amount decreasing control on the fuel injection device.

14. The vehicle according to claim 1, further comprising a subordinate wheel rotating in accordance with running of the vehicle, wherein the vehicle speed detection sensor is a sensor arranged to detect a rotation speed of the subordinate wheel.

15. The vehicle according to claim 1, wherein the vehicle is a motorcycle.

* * * * *